United States Patent [19]

Tashiro et al.

[11] Patent Number: 5,719,768
[45] Date of Patent: Feb. 17, 1998

[54] LOCK-UP CLUTCH CONTROL METHOD

[75] Inventors: Tsutomu Tashiro, Nagoya; Yoshifumi Kato, Nishikamo-gun; Tetsuji Kozaki, Nagoya; Masami Fujitsuna, Kariya, all of Japan

[73] Assignee: Nippondenso Co., Ltd., Kariya, Japan

[21] Appl. No.: 568,616

[22] Filed: Dec. 7, 1995

[30] Foreign Application Priority Data

Dec. 27, 1994 [JP] Japan ................................. 6-325742
Jun. 30, 1995 [JP] Japan ................................. 7-166199

[51] Int. Cl.$^6$ ............................ G06G 7/70; A63B 22/06; F16D 33/00
[52] U.S. Cl. ........................... 364/424.096; 364/424.097; 364/424.088; 477/63; 477/169; 477/65; 192/3.3; 192/3.31; 192/3.58
[58] Field of Search ..................... 364/424.097, 424.098, 364/431.053, 424.096, 424.089, 424.088, 424.087, 424.08; 192/3.31, 3.3, 103 F, 3.56, 3.58, 3.29, 76, 96, 82 T, 3.57; 477/175, 176, 906, 166, 62, 169, 181, 65, 180, 98, 63, 168

[56] References Cited

U.S. PATENT DOCUMENTS

| 4,468,988 | 9/1984 | Hiramatsu | 477/65 |
|---|---|---|---|
| 4,582,185 | 4/1986 | Grimes et al. | 477/169 |
| 4,660,697 | 4/1987 | Yoneda et al. | 477/175 |
| 4,757,886 | 7/1988 | Brown et al. | 192/3.3 |
| 4,957,194 | 9/1990 | Sawa et al. | 477/169 |
| 5,105,926 | 4/1992 | Yoshimura et al. | 477/169 |
| 5,121,820 | 6/1992 | Brown et al. | 364/431.053 |
| 5,527,238 | 6/1996 | Hrovat et al. | 477/166 |
| 5,599,254 | 2/1997 | Tomisawa et al. | 477/176 |
| 5,613,583 | 3/1997 | Kono et al. | 192/3.31 |

FOREIGN PATENT DOCUMENTS

| 60-001458 | 1/1985 | Japan . |
|---|---|---|
| 60-143267 | 7/1985 | Japan . |
| 5-263918 | 10/1993 | Japan . |
| 7-042828 | 2/1995 | Japan . |

*Primary Examiner*—Jacques Louis-Jacques
*Attorney, Agent, or Firm*—Cushman, Darby & Cushman Ip Group of Pillsbury Madison & Sutro LLP

[57] ABSTRACT

A lock-up clutch control method controls a torque converter comprising an input shaft through which a rotating force from an engine is input, an output shaft which outputs a driving force to the side of driving wheels and a lock-up clutch which operates in response to a hydraulic pressure. A control element controls an engaging pressure of the lock-up clutch by way of the hydraulic pressure. The engaging force of the clutch is controlled in accordance with calculated results of a target following up section for calculating a controlled variable so that a slip follows up a target slip and a control system stabilizing section for calculating the controlled variable so that the disturbance applied to the control system is compensated. Thereby, a stable control may be realized without receiving any effect of the disturbance. The disturbance may be estimated and learned for more accurate control.

5 Claims, 9 Drawing Sheets

LOCK-UP CLUTCH CONTROL METHOD

CROSS REFERENCE TO RELATED APPLICATIONS

This application is based on and claims priorities of Japanese Patent Applications No. 6-325742 filed on Dec. 27, 1994 and No. 7-166199 filed on Jun. 30, 1995, the contents of which are incorporated herein by reference.

BACKGROUND OF THE INVENTION

1. Field of the Invention

The present invention relates to a method for controlling a lock-up clutch used in an automatic transmission of a motor vehicle.

2. Description of Related Art

Controlling the hydraulic pressure of an automatic transmission (AT) used in a motor vehicle has been accomplished using a lock-up clutch control method for controlling a slip between input and output shafts of a torque converter. Also a slip lock-up control has been put into practical use as a conventional lock-up clutch control method to save fuel consumption as well as to improve driveability of the motor vehicle having the AT.

The slip lock-up control controls a joining force of the clutch by way of hydraulic pressure so that a slip between input and output of the clutch installed in parallel with a torque converter follows a target slip, as disclosed in Japanese Patent Publication No. Hei. 2-586, for example. It further feedback-controls an engaging force of the clutch so that the slip of the clutch follows the target slip and prevents a hunting of about 1 Hz which is otherwise caused in the slip when a characteristic of a clutch facing member is deteriorated during use.

Here, the hunting in slip described above is caused when a control system becomes unstable due to the deterioration of a characteristic of the clutch facing member. The above-mentioned prior art has prevented the hunting in slip by setting the engaging force of the clutch in response to a time change in the slip and a slip deviation.

However, beside the deterioration of the characteristic of the clutch facing member, the instability of the control system may be caused when a hydraulic pressure fluctuates due to air being mixed in the fluid or due to changes in temperature thereof or when there exists a difference among individual component parts. Therefore, there has been a problem that when those factors become cumulative, the prior art slip lock-up control method described above is unable to compensate for the instability of the feedback control system, thereby causing a hunting in slip.

SUMMARY OF THE INVENTION

Accordingly, it is an object of the present invention to prevent hunting in slip from occurring in a lock-up clutch control by considering the above-mentioned factors as disturbances applied to a control system and by adding a control system stabilizing loop for compensating for an influence of the disturbance into the feedback control system.

It is another object of the present invention to prevent the hunting in slip from occurring in the lock-up clutch control by considering the above-mentioned factors as a disturbance applied to the control system, by estimating the disturbance from a controlled variable and a slip and by correcting the controlled variable based on the estimated value.

It is a still another object of the present invention to prevent the hunting in slip from occurring in the lock-up clutch control by considering the above-mentioned factors as a disturbance applied to the control system and by correcting the controlled variable by a correction value obtained by learning a last disturbance estimated value.

In a lock-up clutch control according to a first aspect of the present invention, a controlled variable is calculated so that a slip is converged to a target slip and a control system stabilizing value is calculated so as to compensate for an influence of the fluctuation of hydraulic pressure and differences among individual component parts, so that the slip is controlled with less hunting.

In a lock-up clutch control according to a second aspect of the present invention, the influence of a disturbance applied to an object to be controlled may be cancelled by having a transfer function model from the controlled variable to the slip, by estimating an error with respect to the transfer function model as the disturbance applied to the object to be controlled from the controlled variable and the slip and by correcting the controlled variable based on a estimated value, so that it becomes possible to prevent the feedback control system from becoming unstable and to control the slip more appropriately.

The above and other objects, features and advantages of the present invention will become more apparent from the following description and the appended claims, taken in conjunction with the accompanying drawings.

DETAILED DESCRIPTION OF PREFERRED EMBODIMENTS

Preferred embodiments of the present invention will be described with reference to the accompanying drawings.

[First Embodiment]

Figure 1:
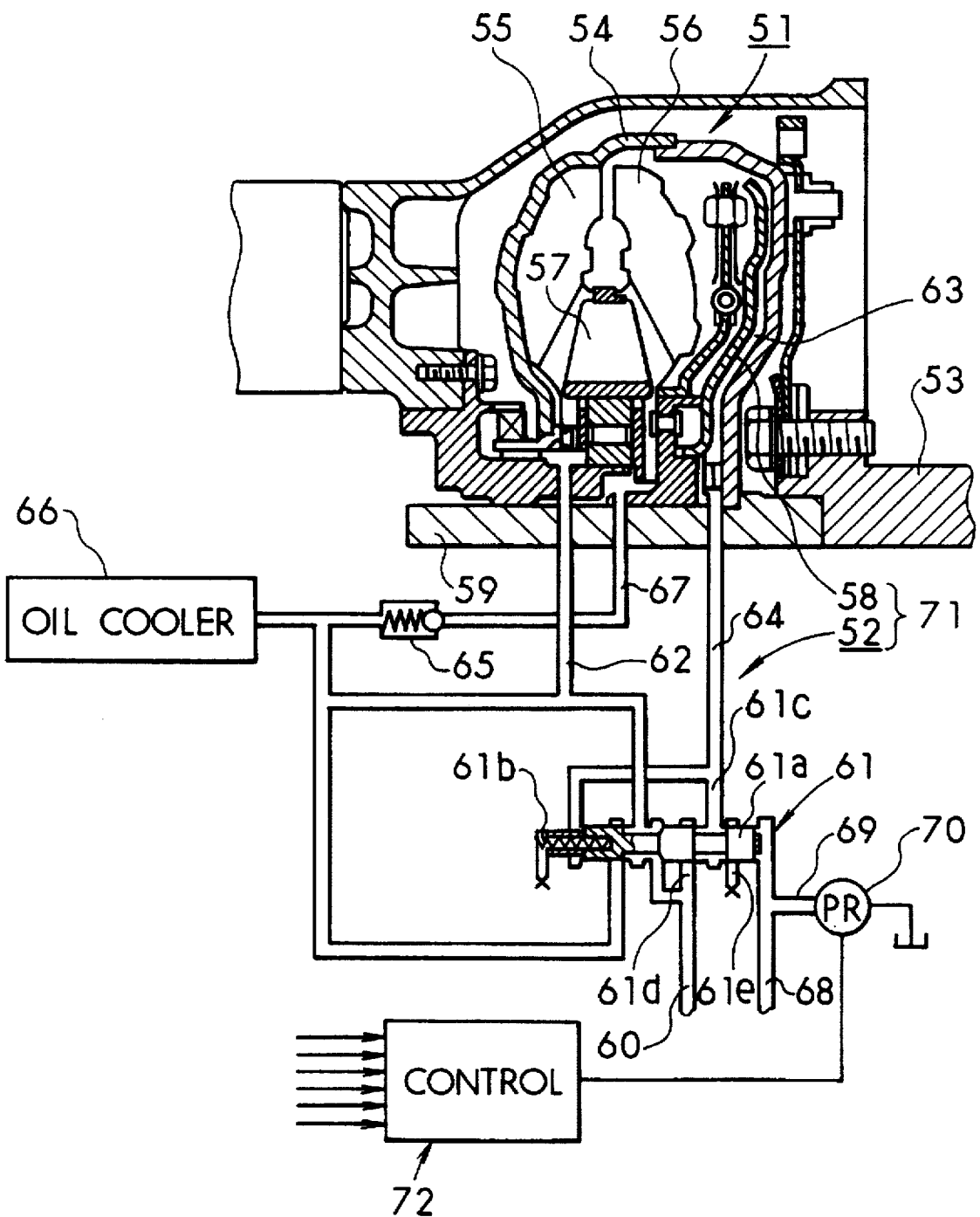
FIG. 1 is a sectional view of a torque converter and a diagram illustrating a hydraulic circuit for controlling the torque converter to which the present invention is applied.

In FIG. 1, a structure of a torque converter 51 and a hydraulic circuit 52 are shown. The torque converter 51 comprises a pump 55 which is fixed at one side within a case 54 coupled with an engine output shaft 53 and which rotates in a body with the engine output shaft 53, a turbine 56 which is an output member rotably provided at the other side within the case 54 so as to face the pump 55 and rotated and driven by the rotation of the pump 55 via working fluid, a stator 57 interposed between the pump 55 and the turbine 56, which acts to increase a torque when a rate of a number of revolutions of the turbine 56 with respect to a number of revolutions of the pump 55 is less than a predetermined value and a lock-up clutch 58 interposed between the turbine 56 and the case 54.

When the turbine 56 is connected to a turbine shaft 59 and the turbine 56 is joined to the case 54, the engine output shaft 53 is directly coupled with the turbine shaft 59 via the case 54.

The working fluid is led to the torque converter 51 through a main line 60 led from an oil pump not shown via a lock-up valve 61 and a converter-in line 62 so that the lock-up clutch 58 is urged in the joining direction by the pressure of the working fluid.

A lock-up releasing line 64 led from the lock-up valve 61 is also connected to a space 63 between the lock-up clutch 58 and the case 54 so that the lock-up clutch 58 is released when a hydraulic pressure (releasing pressure) is introduced into the space 63 from the releasing line 64. A converter-out line 67 for sending out the working fluid to an oil cooler 66 via a pressure holding valve 65 is also connected to the torque converter 51.

The lock-up valve 61 has a spool 61a and a spring 61b for urging the spool 61a in the right direction in the figure and is provided with a pressure governing port 61d to which the main line 60 is connected and a drain port 61e on the both sides of a port 61c to which the lock-up releasing line 64 is connected.

Connected at the right end of the valve 61 in the figure is a control line 68 for causing a pilot pressure to act on the spool 61a and a known hydraulic pressure regulator 70, e.g. a duty solenoid valve, is installed on a drain line 69 bifurcated from the control line 68. The hydraulic pressure regulator 70 regulates the pilot pressure within the control line 68 to a value which corresponds to a duty factor by opening/closing the drain line 69 in very short cycles by repeating ON and OFF with the duty factor which corresponds to an input signal.

Then, the pilot pressure causes the releasing pressure within the lock-up releasing line 64 to act on the spool 61a of the lock-up valve 61 in the same direction with the urging force of the spring 61b. The spool 61a is moved by the relationship between the force of the hydraulic pressure and the urging force and when the lock-up releasing line 64 is communicated with the main line 60 (pressure governing port 61d) or the drain port 61e, the lock-up releasing pressure is controlled to a value which corresponds to the pilot pressure, i.e. the duty factor of the hydraulic pressure regulator 70.

When the duty factor is a maximum, a drain from the control line 68 becomes a maximum and the pilot pressure or the releasing pressure becomes a minimum, thus closing the lock-up clutch 58 completely. When the duty factor is a minimum, the drain becomes a minimum and the pilot pressure or the releasing pressure becomes a maximum, thus releasing the lock-up clutch 58 completely. When the duty factor is in between the maximum and minimum values, the lock-up clutch 58 is put into a slipping state. The slip of the lock-up clutch 58 is then controlled by regulating the releasing pressure in response to the duty factor in this state.

That is, slip adjusting assembly 71 for adjusting the slip between the input and output members of the torque converter 51 is composed of the lock-up clutch 58 and the hydraulic circuit 52.

Figure 3:
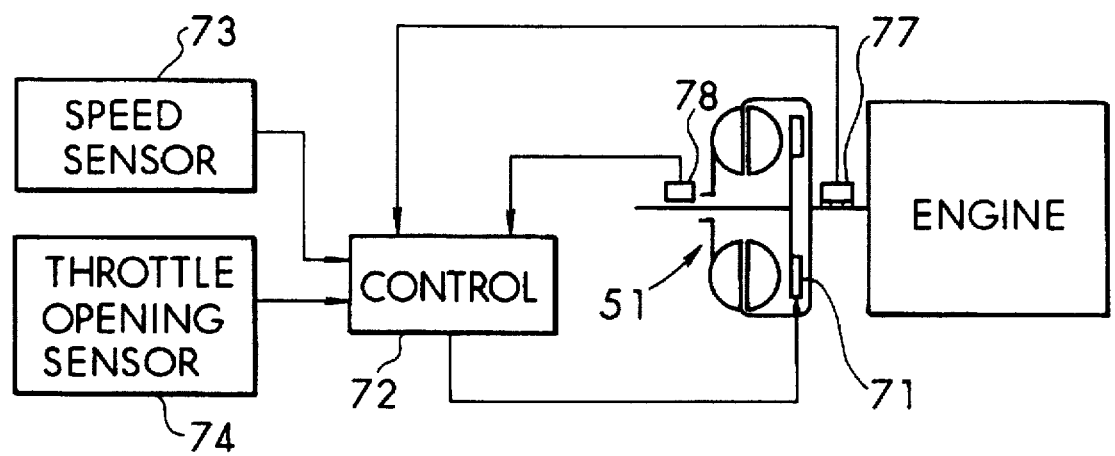
FIG. 3 is a schematic diagram illustrating a relationship between a slip adjusting unit and control system of the first embodiment of the present invention.
Figure 4:
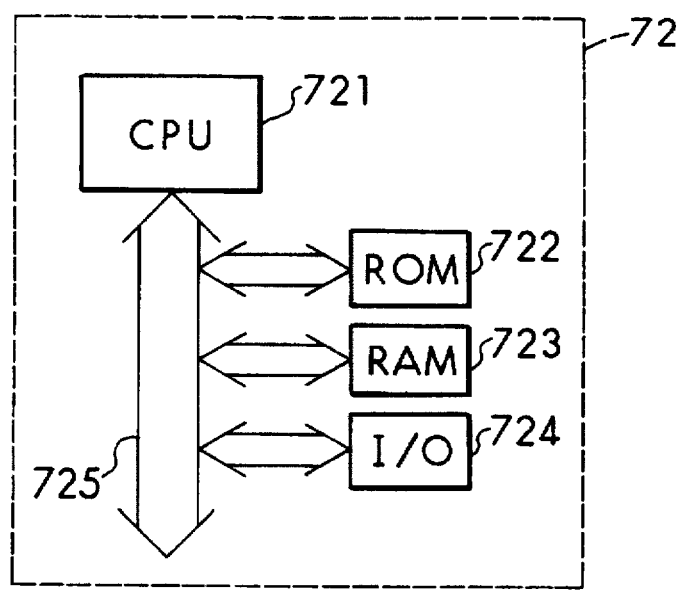
FIG. 4 is a block diagram illustrating a structure of a microcomputer in the control system in FIG. 2.

The operation of the slip adjusting assembly 71 is controlled by a control system or electronic controller 72 as illustrated in FIG. 3. The control system 72 is composed of a microcomputer as shown in FIG. 4, for example. The microcomputer comprises a CPU 721, a ROM 722 for storing control programs and preset values, a RAM 723 for temporarily storing calculation results or the like, an I/O (input/output circuit) 724 for inputting/outputting signals from/to outside and a bus 725 for connecting them.

Various information signals are input to the control system 72 from a speed sensor 73, a throttle opening sensor 74, an engine speed sensor 77, a turbine speed sensor 78 and the like.

Figure 5:
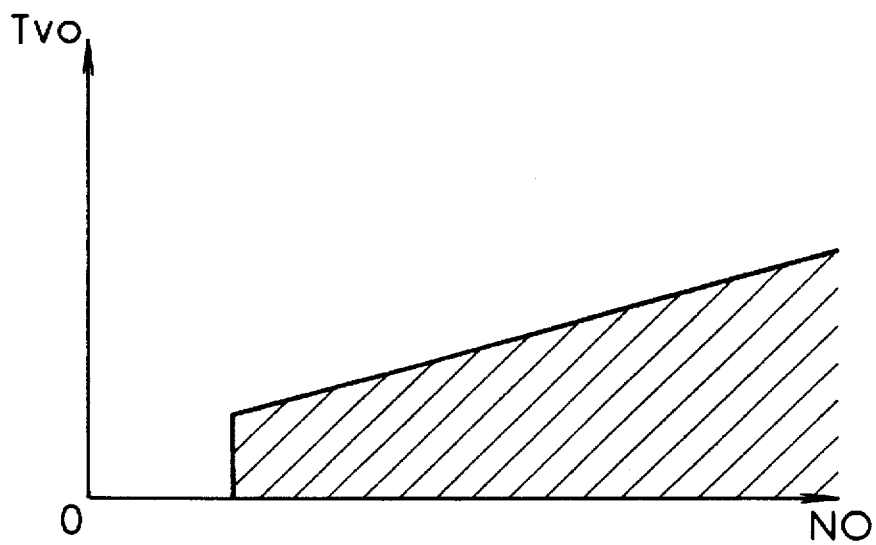
FIG. 5 is a graph showing a slip lock-up control area stored in the microcomputer in FIG. 4.

A slip lock-up control area for performing a slip lock-up Control in response to a throttle opening angle Tvo and a vehicle speed No as shown by hatched area in FIG. 5 for example is stored in advance in the ROM 722 of the control means 72 to control the operation of the slip adjusting means 71 in response to the information signals input from various sensors 73 through 78.

A structure of the control system 72 will be explained below in more detail with reference to FIG. 2.

A target slip Tslp which is an output of target slip setting section 82 is input to slip deviation calculating means 83. An actual slip Nslp which is an output of actual slip calculating section 80 is input to the slip deviation calculating section 83 and also to slip time change calculating means 81 and a control system stabilizing section 841 of controlled variable calculating section 84.

A slip deviation Dslp which is an output of the slip deviation calculating section 83 is input to a target value following up section 840 of the controlled variable calculating section 84. The target value following up section 840 calculates to cause the slip Nslp to converge to the target slip Tslp. A slip time change Nslpd which is an output of the slip time change calculating section 81 is input to the control system stabilizing section 841 of the controlled variable calculating section 84. The control system stabilizing section 841 performs calculations for compensating a change in a transfer function.

An output Dt1 of the target value following up section 840 and an output Dt2 of the control system stabilizing section 841 are input to a controlled variable calculating section 842. A controlled variable Dty which is an output of the controlled variable calculating section 842 is input to engaging force adjusting section 85.

Next, the operation of the control means 72 will be explained with reference to a flowchart shown in FIG. 6.

(Step 100) An engine speed Ne is calculated from the output of engine speed sensor 77 and a turbine speed Nt is calculated from the output of turbine speed sensor 78.

(Step 110) The slip Nslp=Ne−Nt is calculated in the slip calculating unit 80 from the engine speed Ne and the turbine speed Nt.

(Step 120) A slip time change Nslpd(n)=Nslp(n)−Nslp(n)−1) is calculated in the slip time change calculating unit 81 from a current slip Nslp(n) and a last slip Nslp(n−1). Although Nslpd is calculated from the last slip in the present embodiment, the slip time change may be calculated by using a slip more than two times before the current slip, for example.

(Step 130) The target slip Tslp which is a target of the actual slip Nslp is set in the target slip setting section 82.

(Step 140) A slip deviation Dslp=Tslp−Nslp is calculated in the slip deviation calculating section 83.

(Step 150) The output $Dt1 = ki \times \Sigma Dslp + Kp2 \times Dslp$ is calculated with respect to the slip deviation Dslp, an integrated value of the slip deviation ΣDslp, a gain Ki and a gain Kp2 in the target value following up section 840. Ki and Kp2 are set so that the slip Nslp falls with an area of 30 to 80 rpm within two seconds after the start of the control.

(Step 160) The output $Dt2 = Kp \times Nslp + Kd \times Nslpd$ is output with respect to the slip Nslp, the slip time change Nslpd, a gain Kp and a gain Kd in the control system stabilizing section 841. Kp and Kd are set so that the slip will not become oscillatory. It is also possible to feed back a value obtained by providing a certain offset on the slip Nslp, instead of feeding back the slip Nslp as it is.

(Step 170) A controlled variable Dty=Dt1+Dt2+Df is output with respect to the output Dt1 of the target value following up section 840 and the output Dt2 of the control system stabilizing section 841 in the controlled variable calculating section 842. Here, Df is an offset of the controlled variable Dty. Although the output Dt1 of the target value following up section 840 and the output Dt2 of the control system stabilizing section 841 are used as they are in the present embodiment, it is possible to calculate by weighting either one.

(Step 180) A signal for driving the hydraulic pressure regulator 70 is output based on the controlled variable Dty in the engaging force adjusting section 85.

According to the present embodiment, the slip may be controlled appropriately without causing any hunting by preventing the control system from becoming unstable even if there exists the fluctuation of oil pressure or the difference among individual component parts by controlling the engaging force of the clutch in response to calculated results of the target value following up section 840 for calculating the controlled variable so that the slip follows up the target slip and of the control system stabilizing section 841 for calculating the controlled variable so that the disturbance applied to the control system is compensated.

[Second Embodiment]

Figure 7:
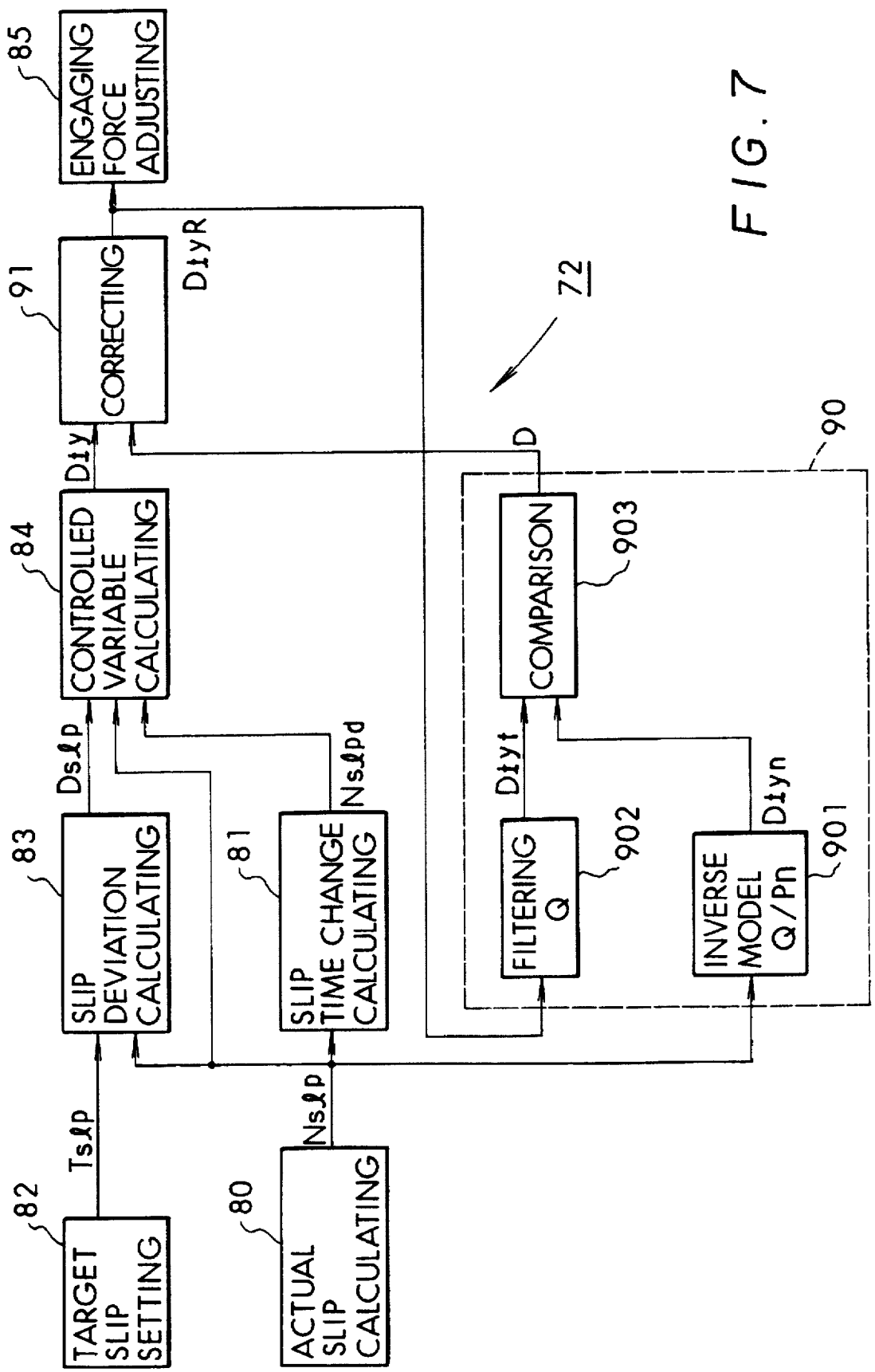
FIG. 7 is a block diagram illustrating a structure of control system for executing a lock-up clutch control according to a second embodiment of the present invention.

Disturbance estimating means 90 and controlled variable correcting means 91 are added to the structure of the control means 72 of the first embodiment, as shown in FIG. 7. In the present embodiment, the same reference numerals are used to the parts functioning in the same manner with those in the first embodiment for brevity and only points different from the first embodiment will be explained.

Figure 2:
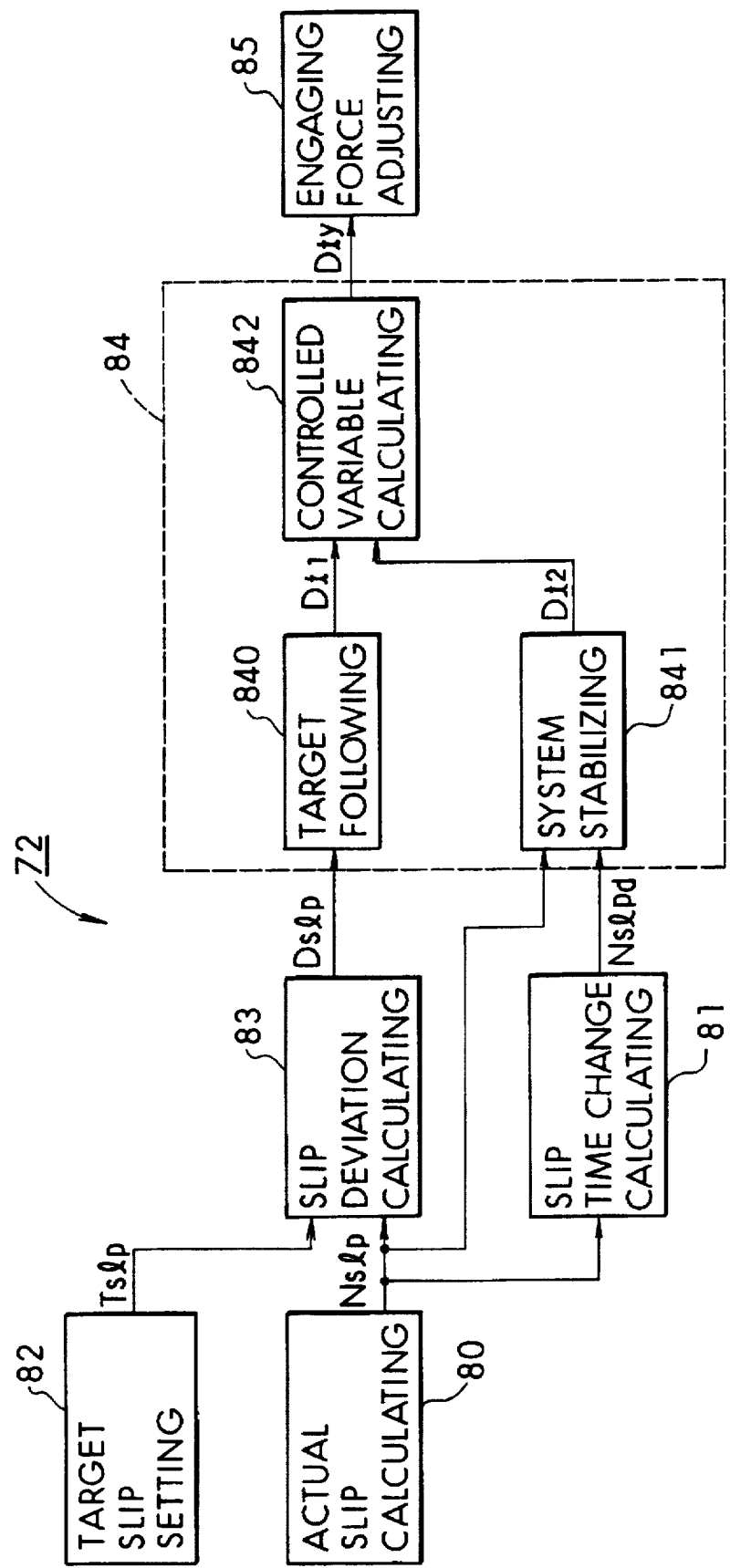
FIG. 2 is a block diagram illustrating a structure of a control system for executing a lock-up clutch control according to a first embodiment of the present invention.

The embodiment shown in FIG. 7 is different from that shown in FIG. 2 in that a controlled variable correcting section 91 is inserted between the controlled variable calculating means 84 and the engaging force adjusting section 85 and that an output of the disturbance estimating section 90 is input to the controlled variable correcting section 91. Although the content of the controlled variable calculating section 84 is omitted in the figure, it is constructed in the same manner with that shown in FIG. 2.

The disturbance estimating section 90 comprises an inverse model section 901, a filtering section 902 and a comparison section 903.

The inverse model section 901 is designed to have a transfer function Q/Pn, with respect to a transfer function model Pn which is a second-order approximation of the transfer function from the controlled variable Dty to the slip Nslp and a secondary filter Q. The inverse model section 901 inputs the actual slip Nslp and outputs a controlled variable estimated value Dtyn to the comparison section 903.

The filtering section 902 comprises the filter Q and outputs a filtered value Dtyf of the controlled variable DtyR to the comparison section 903.

The comparison section 903 outputs an estimated disturbance value D to the controlled variable correcting section 91.

The controlled variable correcting section 91 calculates a corrected controlled variable DtyR from the controlled variable Dty and the estimated disturbance D and outputs it to the engaging force adjusting section 85.

Figure 8:
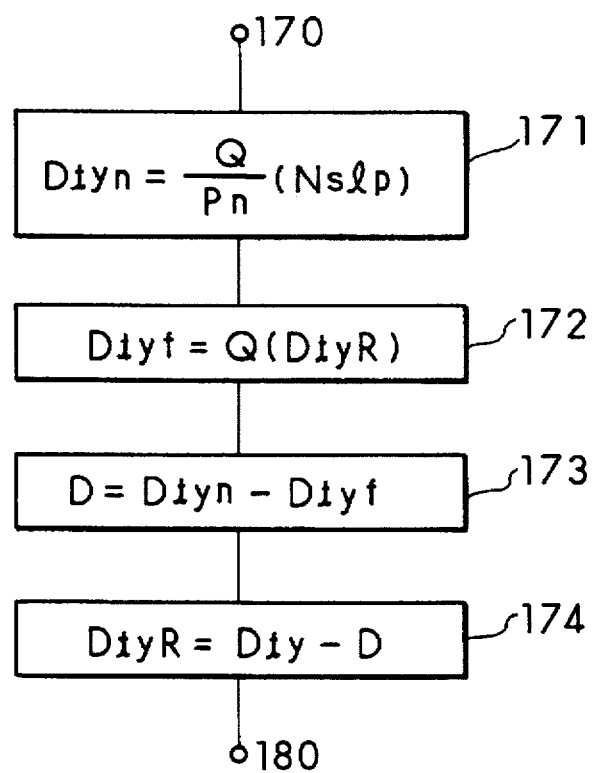
FIG. 8 is a flowchart for explaining a control process of the control system shown in FIG. 7.

The operation of the circuit shown in FIG. 7 will be explained with reference to a flowchart shown in FIG. 8. This process is inserted between step 170 and step 180 in the flowchart shown in FIG. 6.

(Step 171) The controlled variable estimated value Dtyn which is a result of the slip Nslp passed through the transfer function Q/Pn is output in the inverse model section 901.

(Step 172) The controlled variable filtered value Dtyf which is a result of the corrected controlled variable DtyR passed through the filter Q is output in the filtering section 902.

(Step 173) The estimated disturbance D=Dtyn−Dtyf is output in the comparison section 903.

(Step 174) The corrected controlled variable DtyR= Dty−D is output in the controlled variable correcting means 91.

Because the controlled variable is corrected by estimating the disturbance applied to the object to be controlled so that the influence of the estimated disturbance is canceled, the feedback control system may be prevented from becoming unstable due to the influence of the disturbance.

Although the both of the transfer function model Pn and the filter Q are second-order models in the present embodiment, it is possible to design them by changing the order of models depending on a required accuracy of disturbance estimation. Further, although the inverse model section 901 and the filtering section 902 are constructed by using the same filter Q, filters having different characteristics may be used in the inverse model section 901 and the filtering section 902.

Figure 9:
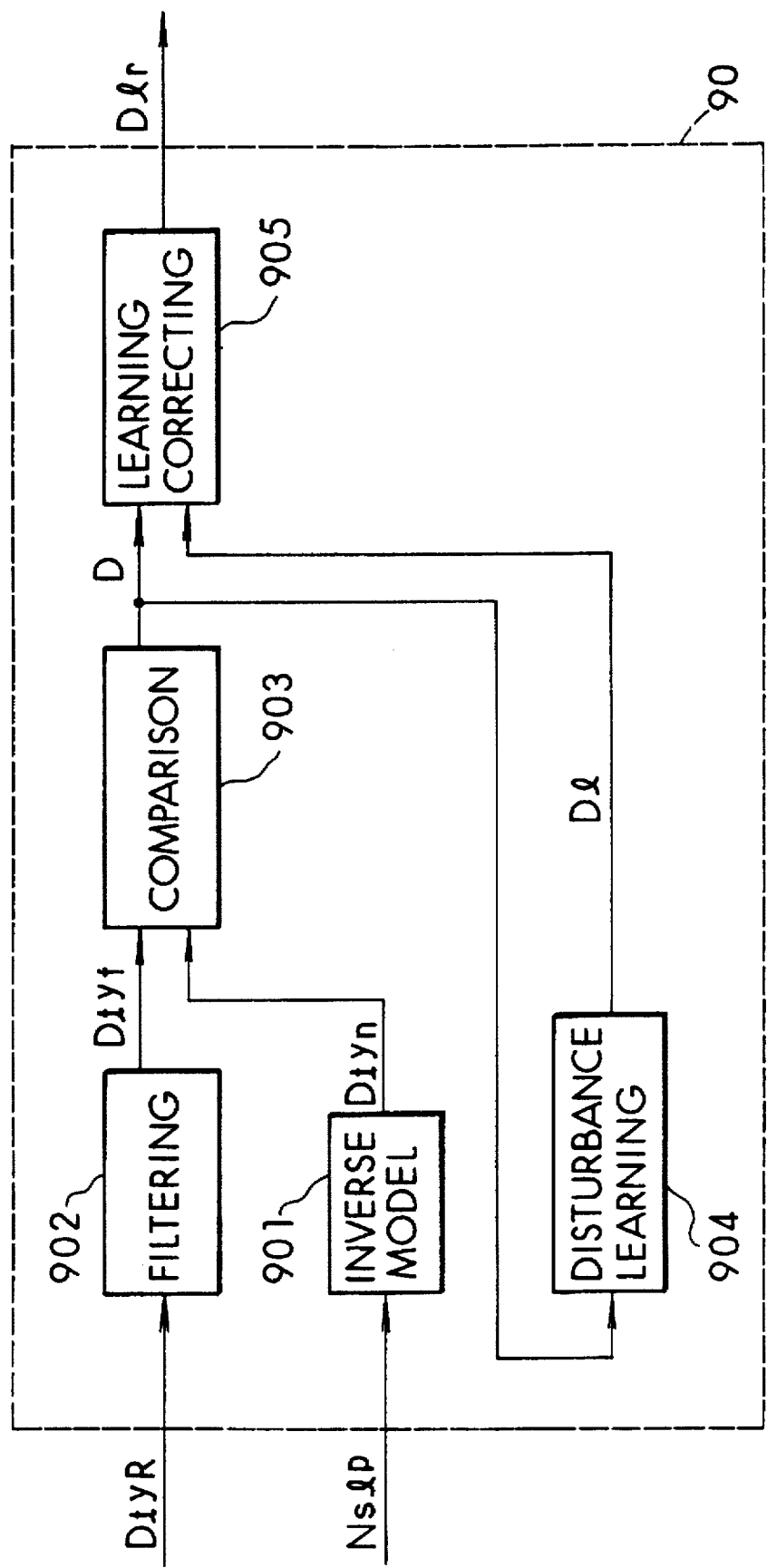
FIG. 9 is a block diagram illustrating a modified example of disturbance estimating unit in FIG. 7.

A disturbance learning section 904 and a learning correcting section 905 may be also added to the disturbance estimating section 90 of the present embodiment in FIG. 7, as shown in FIG. 9.

The disturbance learning section 904 stores an estimated disturbance D(n−1) when the last disturbance has been estimated among estimated disturbance D output from the comparison section 903 when it has been in the slip lock-up control area, calculates a learned value D1 of disturbance from that and outputs it to the learning correcting section 905. The learning correcting section 905 calculates a corrected estimated disturbance D1r from the estimated disturbance D and the learned disturbance value D1 and outputs it to the controlled variable correcting means 91.

Figure 10:
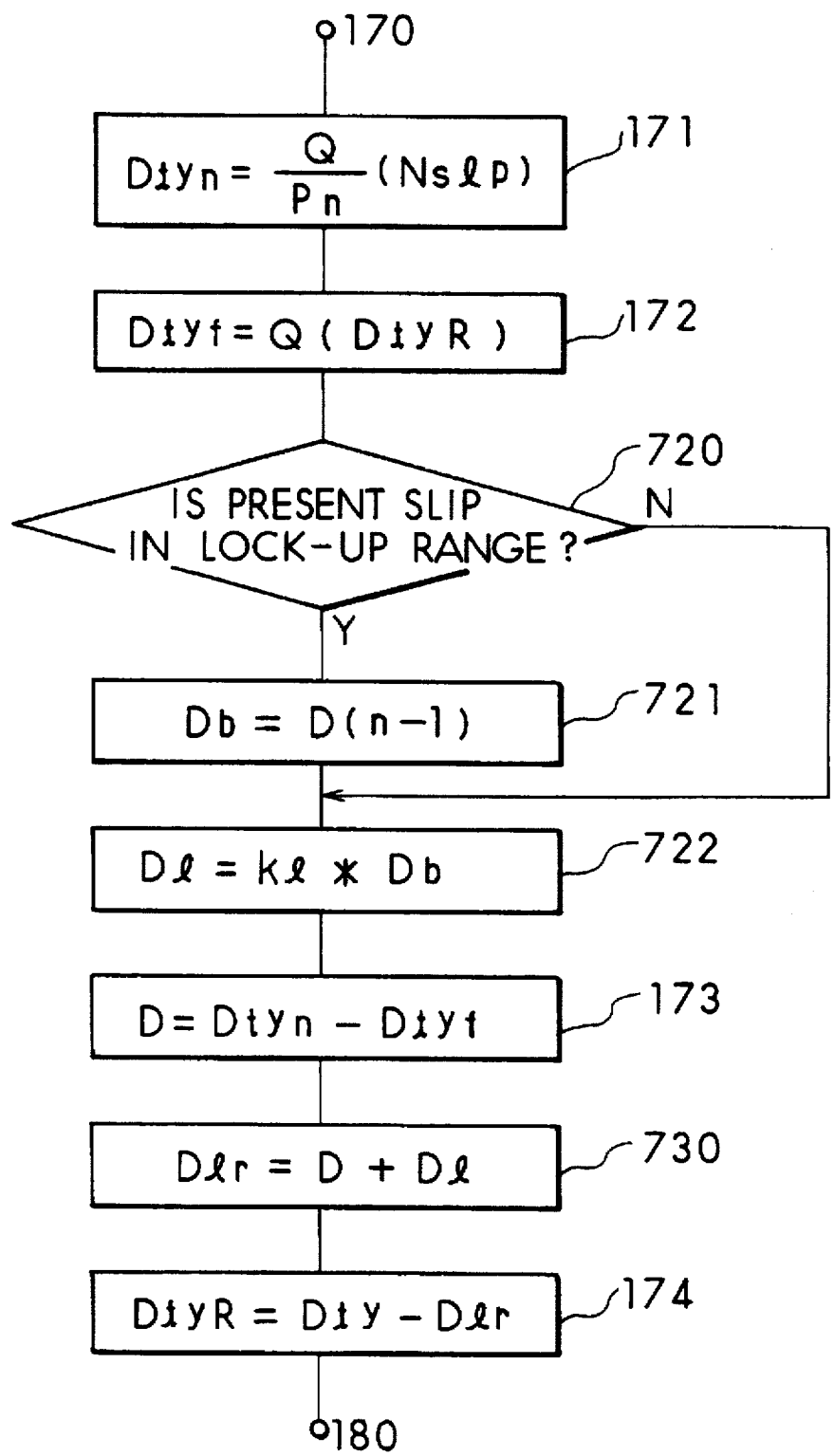
FIG. 10 is a flowchart for explaining a control process of the control system in FIG. 9.

The operation of the circuit shown in FIG. 9 will be explained with reference to a flowchart shown in FIG. 10. The control process shown in FIG. 10 is inserted between the step 170 and the step 180 in the flowchart shown in FIG. 6. That is, the flowchart shown in FIG. 10 is inserted instead of the flowchart shown in FIG. 8.

(Step 171) The controlled variable estimated value Dtyn which is a result of the slip Nslp passed through the transfer function Q/Pn is output in the inverse model section 901.

(Step 172) The controlled variable filtered value Dtyf which is a result of the corrected controlled variable DtyR passed through the filter Q is output in the filtering section 902.

(Step 720) It is determined in the disturbance learning section 904 whether or not it was out of the slip lock-up control area in FIG. 5 in the last time and it falls into the slip lock-up control area this time. When it enters into the area, the process advances to a step 722 via a step 721. When it does not fall in the slip control area, the process advances directly to the step 722.

(Step 721) The last estimated disturbance Db=D(n−1) is calculated. This D(n−1) is an estimated disturbance when the last disturbance has been estimated when it was within the slip lock-up control area in the last time.

(Step 722) The estimated disturbance D1=Kl×Db is output. Here, Kl is a learned gain and is set to a positive value less than 1.

(Step 730) The corrected disturbance estimate D1r=D+D1 is calculated and output in the learning correcting section 905.

As a result, because the corrected estimated disturbance D can learn the value which corresponds to the estimated disturbance D(n−1) estimated in the last time, it becomes possible to prevent the feedback system from becoming unstable due to the effect or influence of the disturbance which has been successively acting since when it was in the slip lock-up control area in the last time such as the disturbance which acts for a long period of time such as the individual difference of each component part, elapsed change and oil temperature, for example.

Further, because the disturbance may be cancelled in advance before the effect of the disturbance appears by the learning correction, the time which takes to estimate the disturbance may be shortened, thus improving the response characteristic of the control.

Although the learning is made without the throttle opening angle in the present embodiment, it is possible to divide the throttle opening area into several areas and to perform the learning per each area. In this case, disturbance related not only to AT but also to dispersion of engine characteristics may be corrected.

Figure 11:
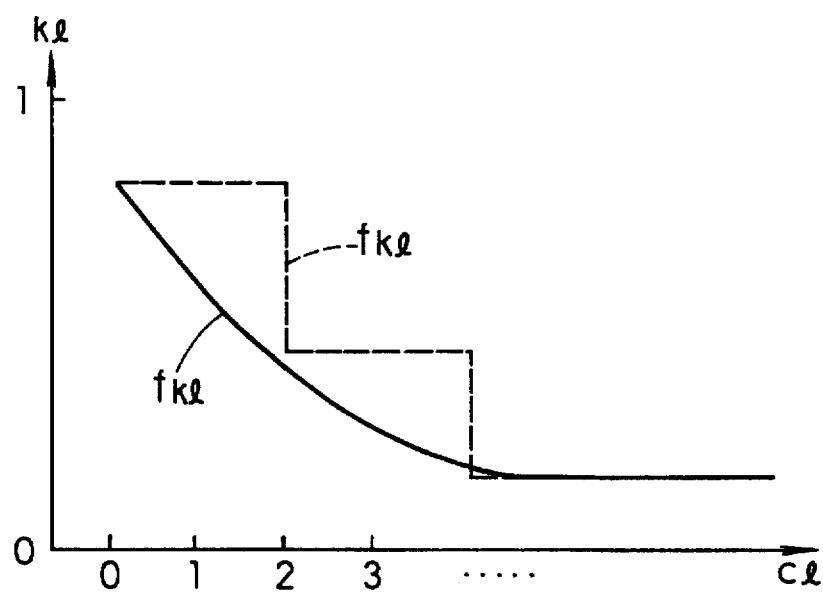
FIG. 11 is a graph showing a learned gain characteristic of a disturbance learning section in FIG. 9.

Further, although the learned gain Kl is set to a constant value in the present embodiment, it may have a characteristic $f_{kl}$, as shown in FIG. 11, which decreases as the increase in the number of learning Cl along a gradually changing characteristic (solid line) or stepped characteristic (dotted line) and converges to the constant value.

Figure 12:
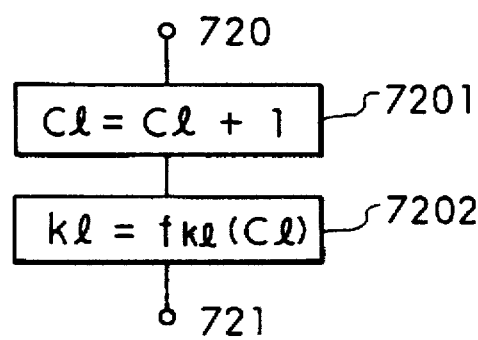
FIG. 12 is a flowchart showing a part of modification of the flowchart in FIG. 10.

In this case, a flowchart shown in FIG. 12 is inserted between the step 720 and step 721 in FIG. 10.

(Step 7201) A learning time counter Cl is added for counting a number of times of learning.

(Step 7202) A learning gain Kl=$f_{kl}$(Cl) is calculated. Here, $f_{kl}$ is a function having characteristics as shown in FIG. 11.

As a result, a high response characteristic can be maintained when the number of times of learning is less and the degradation of the stability due to the disturbance estimation error may be prevented when the learning is repeated.

Figure 6:
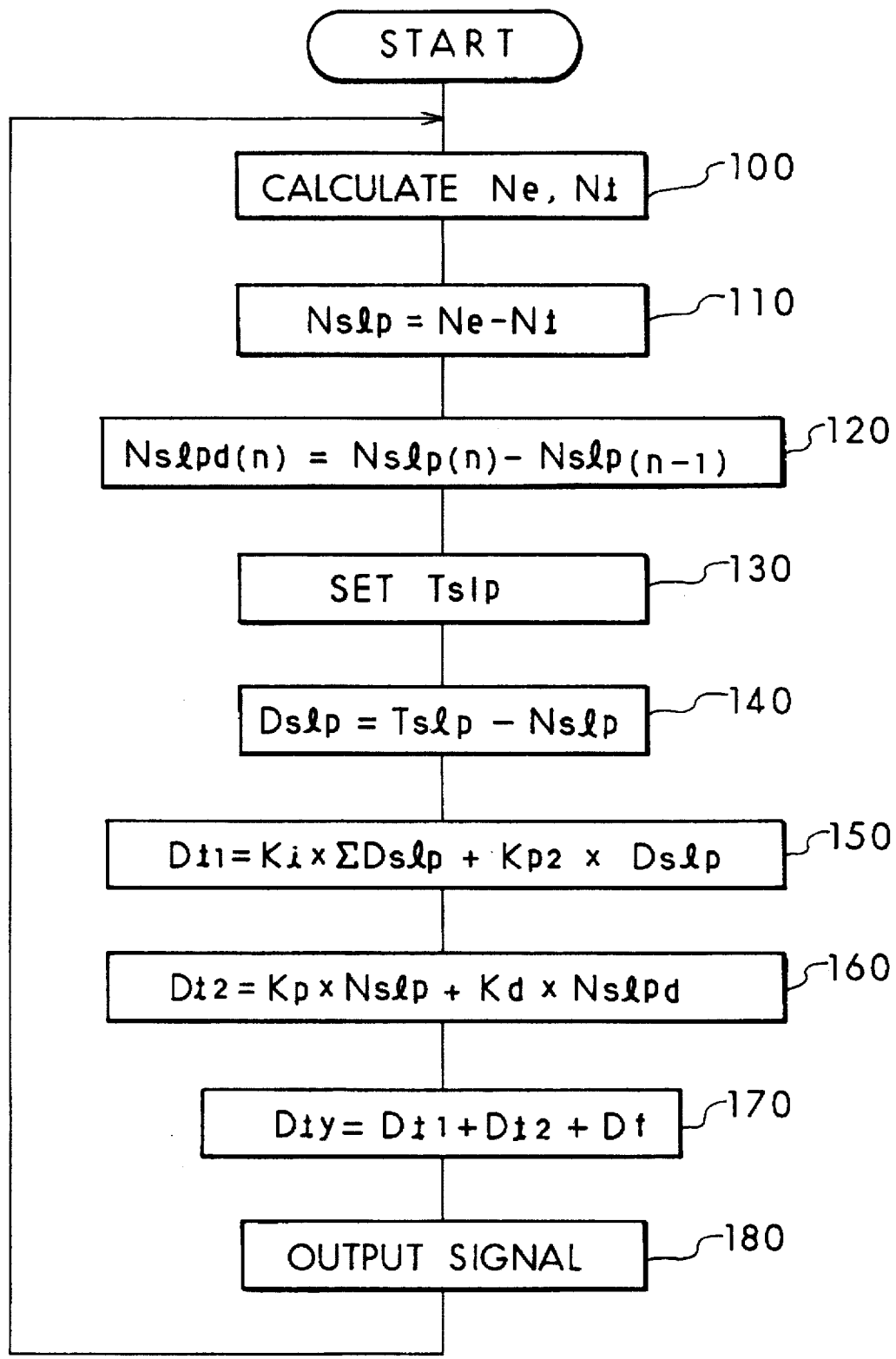
FIG. 6 is flowchart for explaining the control process of the control system in FIG. 1.
Figure 13:
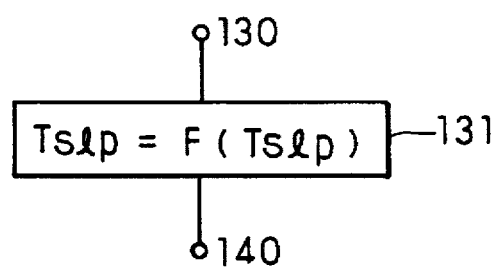
FIG. 13 is a flowchart showing a part of modification of the flowchart in FIG. 6.

It is also possible to add a process step 131 shown in FIG. 13, i.e., a process for replacing the target slip Tslp which is the output of the target slip setting means 82 by a result of the target slip Tslp passed through a first-order low-pass filter F, between the step 130 and step 140 in FIG. 6 of the present embodiment. At this time, the characteristic of the low-pass filter is set so that a cut-off frequency thereof becomes 2 to 10 Hz.

As a result, a sudden change or discontinuity of the target slip Tslp may be prevented, so that the slip may be prevented from hunting due to the sudden change of the controlled variable Dty. It is to be noted that the step 131 in FIG. 13 may be applied to the first embodiment described before.

Further, it is possible to use a second-order filter, instead of the first-order filter.

According to the second embodiment, the effect of the disturbance applied to the object to be controlled may be cancelled by having the transfer function model from the controlled variable to the slip, by estimating the error with respect to the transfer function model from the controlled variable and the slip as the disturbance applied to the object to be controlled and by correcting the controlled variable based on the estimated value, so that it becomes possible to prevent the feedback control system from becoming unstable due to the effect of the disturbance and to control the slip satisfactorily.

The control system stabilizing section 841 in the controlled variable calculating means 84 may be omitted and along that, the slip time change calculating means 81 and the controlled variable calculating section 842 may be omitted in the second embodiment.

As described above, according to the first aspect of the present invention, the following advantages may be obtained.

That is, according to the present invention, it becomes possible to prevent the control system from becoming unstable and to control the slip without causing any hunting even if there exists disturbances applied to the object to be controlled, e.g. the fluctuation of oil pressure, the difference among individual component parts or the like, by controlling the engaging force of the clutch in accordance with the calculated results of the target following up section for calculating the controlled variable so that the slip follows up the target slip and the control system stabilizing section for calculating the controlled variable so that the disturbance applied to the control system is compensated.

According to the second aspect of the present invention, the effect of the disturbance applied to the object to be controlled (the fluctuation of the oil pressure and the difference among individual component parts, etc.) may be cancelled by having the transfer function model from the controlled variable to the slip within the controlled variable calculating means, by estimating the error with respect to the transfer function model as the disturbance applied to the object to be controlled from the controlled variable and the slip and by correcting the controlled variable based on the estimated value, so that it becomes possible to prevent the control system from becoming unstable and to control the slip without causing any hunting.

Further, it provides an advantage that the feedback system is prevented from becoming unstable due to the effect of disturbance which acts for a long period of time such as the individual difference, elapsed change and oil temperature by correcting the controlled variable by the corrected value obtained by learning estimated disturbance up to the last estimated disturbance. Further, because the disturbance can be cancelled in advance by performing learning correction, the time necessary for estimating the disturbance may be shortened, thus improving the response characteristics of the control.

Still further, it becomes possible to deal with a larger disturbance and to control the slip without causing any hunting even if a larger disturbance is generated by controlling the engaging force of the clutch in accordance with calculated results of the target following up section for calculating the controlled variable so that the slip follows up the target slip and the control system stabilizing section for calculating the controlled variable so that the disturbance applied to the control system is compensated. That is, because the controlled variable of the engaging force of the clutch is found from the target follow up section and the control system stabilizing section and the transfer function model from the controlled variable to the slip is included, the error with respect to the transfer function model is estimated as the disturbance applied to the object to be controlled from the controlled variable and the slip and the controlled variable is corrected the controlled variable based on the estimated value, it becomes possible to deal with the lager disturbance.

Still further, the following advantages (1) through (3) below may be attained:

(1) It becomes possible to prevent the control system from becoming unstable and to control the slip without causing any hunting even if there is the fluctuation of oil pressure and difference among individual component parts by controlling the engaging force of the clutch in accordance with calculated results of the target following up section for calculating the controlled variable so that the slip follows up the target slip and the control system stabilizing section for calculating the controlled variable so that the disturbance applied to the control system is compensated;

(2) Because the effect of the disturbance applied to the object to be controlled may be cancelled by having the transfer function model from the controlled variable to the slip within the controlled variable calculating means, by estimating the error with respect to the transfer function model as the disturbance applied to the object to be controlled from the controlled variable and the slip and by correcting the controlled variable based on the estimated value, it becomes possible to prevent the feedback control system from becoming unstable due to the effect of the disturbance and to control the slip satisfactorily; and (3) Because the sudden change of the target slip and discontinuity thereof may be eliminated by calculating the slip deviation by using a filtered value of the target slip, instead of the target slip, the sudden change of the controlled variable which may otherwise cause a hunting may be blocked and the slip may be controlled without causing any hunting.

While preferred embodiments of the present invention have been described using specific terms, such description is for illustrative purposes only, and it is to be understood that various changes and variations may be made without departing from the spirit of the invention.

What is claimed is:

1. A computer-implemented process for controlling a slip between input and output shafts of a torque converter, said method comprising the steps of:

monitoring operating conditions of an engine and a turbine connected thereto to determine said slip;

calculating a slip deviation between said slip and a target slip;

calculating a time change in said slip;

calculating a target follow-up value from said slip deviation;

calculating a control system stabilizing value for compensating an effect of a disturbance applied to a control system from said slip and said time change;

obtaining a controlled variable for a hydraulic pressure adjusting unit from said target follow-up value and said control system stabilizing value; and controlling said hydraulic pressure adjusting unit, which is operatively coupled to said torque converter, based on said controlled variable to control said slip.

2. A computer-complemented process for controlling a slip between input and output shafts of a torque converter, said method comprising the steps of:

monitoring operating conditions of an engine and a turbine connected thereto to determine said slip;

calculating a controlled variable for a hydraulic pressure adjusting unit;

estimating, based on said controlled variable and said slip, an error from a predetermined transfer function model as a disturbance applied to an object to be controlled, said transfer function model defining a transfer function from said controlled variable to said slip; and correcting said controlled variable for said hydraulic pressure adjusting unit based on said estimated disturbance value; and controlling a hydraulic regulator operatively coupled to said torque converter based on said corrected controlled variable to control said slip.

3. A method according to claim 2, further comprising the step of:

learning repeatedly said estimated disturbance value; and correcting said controlled variable based on said learned estimated value.

4. A method according to claim 2, wherein said controlled variable calculating step includes the steps of:

calculating a slip deviation between said slip and said target slip;

calculating a target follow-up amount from said slip deviation;

calculating a control system stabilizing value for compensating an effect of said disturbance from said slip and said time change; and obtaining said control variable for actuating a hydraulic pressure adjusting unit operatively coupled to said torque converter from said target follow-up value and said control system stabilizing value.

5. A lock-up clutch control method according to claim 2, wherein said target slip is filtered.

* * * * *